United States Patent [19]

Andre et al.

[11] Patent Number: 4,680,834
[45] Date of Patent: Jul. 21, 1987

[54] CABLE TIE

[75] Inventors: Guy Andre, Seyssinet-Pariset; Robert Gollin, Grenoble; Gaetan Daloia, Echirolles, all of France

[73] Assignee: A. Raymond, Lorrach, Fed. Rep. of Germany

[21] Appl. No.: 885,777

[22] Filed: Jul. 15, 1986

[30] Foreign Application Priority Data

Jul. 16, 1985 [DE] Fed. Rep. of Germany ....... 3525351

[51] Int. Cl.$^4$ ............................................. B65D 63/00
[52] U.S. Cl. ............................ 24/16 PB; 24/30.5 P; 24/17 AP
[58] Field of Search ........... 24/16 PB, 17 AP, 30.5 P; 248/74.3; 292/318, 321, 322

[56] References Cited

U.S. PATENT DOCUMENTS

| Re. 31,541 | 3/1984 | Wood | 24/16 PB |
|---|---|---|---|
| 3,224,056 | 12/1965 | Joffe | 24/16 PB |
| 3,606,648 | 9/1971 | Schuler | 24/16 PB |
| 3,744,096 | 7/1973 | Kok | 24/16 PB |
| 3,747,164 | 7/1973 | Fortsch | 24/16 PB |
| 4,093,288 | 6/1978 | Suzuki | 292/321 |
| 4,422,217 | 12/1983 | Barrette | 24/16 PB |
| 4,498,507 | 2/1985 | Thompson | 24/30.5 P |
| 4,532,679 | 8/1985 | Scott | 24/16 PB |
| 4,574,434 | 3/1986 | Shupe et al. | 24/16 PB |

FOREIGN PATENT DOCUMENTS

| 1519868 | 8/1978 | United Kingdom | 24/16 PB |
|---|---|---|---|
| 2063354 | 6/1981 | United Kingdom | 24/16 PB |

Primary Examiner—Victor N. Sakran
Attorney, Agent, or Firm—Finnegan, Henderson, Farabow, Garrett & Dunner

[57] ABSTRACT

A device for tying cable bundles including a plastic tightening strap of indeterminate length having transverse ribs and a separate locking piece also of plastic, having an orifice for receipt of two thicknesses of the tightening strap and two tongues which project into the orifice and interact with the transverse ribs on the strap. The tongues, each of which carries at least one engaging tooth, are formed of inner walls of the locking piece opposite one another so that they can flex open to permit the strap to pass through in one direction, but which spring back to prevent the strap from passing back through in the opposite direction.

5 Claims, 11 Drawing Figures

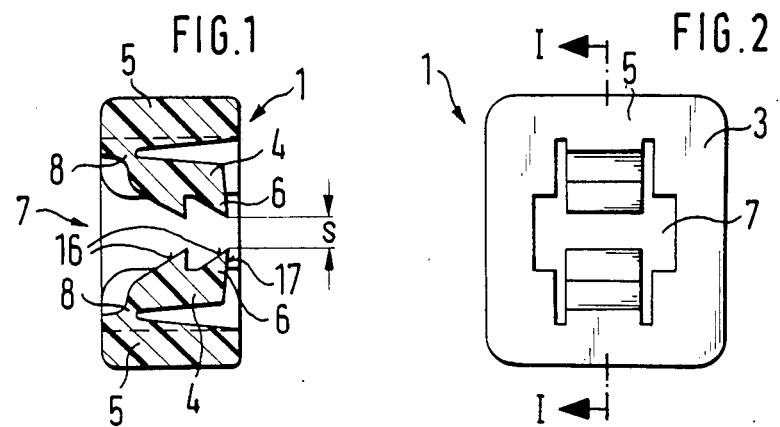
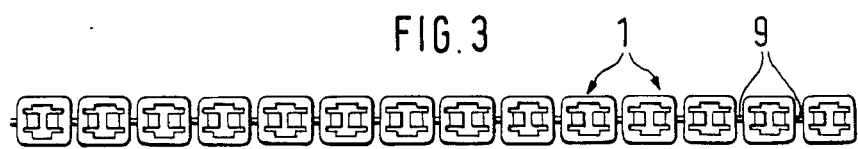
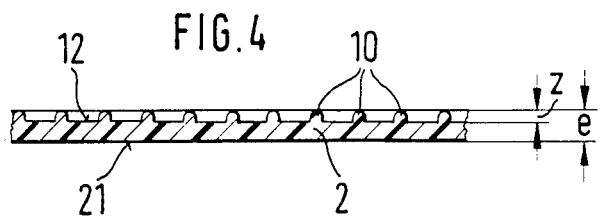
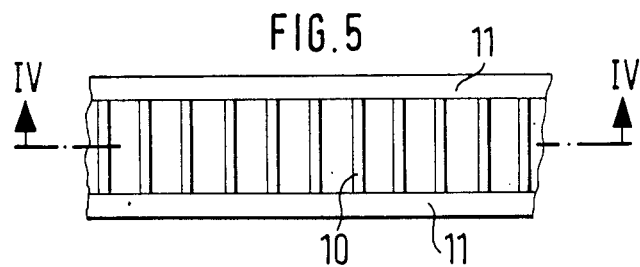

CABLE TIE

BACKGROUND OF THE INVENTION

This invention relates to a device for tying cable bundles, consisting of a plastic tightening strap of indeterminate length having transverse ribs or serrations, and a separate locking piece or clip also of plastic, having an orifice through which the tightening strap leads and locking means projecting into the orifice and interacting with the transverse ribs or serrations on the strap to lock it in place.

Conventional tightening staps used for this particular purpose are produced by first extruding a strip of material that is smooth on all sides and then, in a subsequent operation, passing it through a pair of rollers, in which transverse grooves or serrations are formed on one flat side. To tie a cable bundle, this strap is pushed through the orifice of a locking piece in a direction counter to the locking surfaces of the locking means, and, after being wrapped round the cable bundle, is then guided back through the same orifice again but from the opposite side of the locking piece that faces the bundle, until the first transverse ribs on the strap engage with the locking means. The other end of the strap is then pulled back through the locking piece, until the cable bundle is wrapped tightly, and any undesired excess length of the strap is cut off. Thus, only an amount of tightening strap sufficient to wrap round the cable bundle is ever used.

Such a cable tie is shown, for example, in U.S. Pat. No. 3,744,096. As shown in FIG. 1 of the patent, the locking piece consists of two solid legs which are elastically connected to one another on their sides by means of flexible bridging webs to form a clip in the shape of a clothes pin, the legs of which have, at their shorter ends, opposed teeth that engage corresponding serrations on the tightening strap. The gap between the outer edges of the opposed teeth of the legs is set so that it is equal to or somewhat larger than double the thickness of the strap, measured from the bottom of the notches between the serrations. To pass the tightening strap through the clip, it is therefore necessary to first enlarge the gap somewhat. To permit this, the legs have to be pressed together with the thumb and index finger at the rear end of the legs opposite the ends having the teeth and facing the cable bundle, so that the tightening strap can pass through the widened gap between the engaging teeth. After the strap has been wrapped round the cable bundle, the legs have to be pressed together once again, so that the strap end, now looped round the bundle, can be guided back through the tooth gap a second time. This operation to set the clip is not only highly impractical, but also inconvenient.

In another embodiment as shown in FIG. 3 of this patent, the locking piece is composed of two parts, and includes a housing having an orifice for passage of the two ends of the strap that widens conically on both sides, and a wedge which can be pressed into the conical orifice from its open side to clamp the two ends of the tightening strap in the orifice.

In this embodiment, although it is no longer necessary to manually enlarge the gap to permit the ends of the strap to pass through the clip, it is nevertheless still necessary to press the wedge subsequently into place for locking purposes, with the result that this design is not only more complicated to handle, but is also more expensive to produce.

An object of the invention therefore is to provide a cable tie of the type having a serrated strap and locking clip where it is possible to pass the strap ends into the locking clip and lock the strap in place without any additional prior or subsequent manipulation of the engaging elements.

SUMMARY OF THE INVENTION

This object is achieved, in accordance with the present invention by providing a cable tie comprising a tightening strap having a plurality of transverse ribs on at least one longitudinal surface and a locking piece having a housing, an orifice in the housing through which the tightening strap can pass, and locking means projecting into the orifice from opposite sides of the housing for interacting with the transverse ribs, each of said locking means having at least one engaging tooth for engaging the ribs of the strap with the gap between the teeth being larger than the thickness of the strap, but smaller than double the strap thickness less the height of a rib, and wherein at least one of said locking means is resiliently connected to the housing so that it can flex open to permit the strap to pass in one direction but will spring back to engage its tooth with a rib of the strap to prevent it from passing back in the opposite direction.

The accompanying drawings illustrate one embodiment of the invention and, together with the description, serve to explain the principles of the invention.

BRIEF DESCRIPTION OF THE DRAWINGS

FIG. 1 shows a side view of the locking piece of the cable tie of this invention in cross-section taken along the line I—I of FIG. 2;

FIG. 2 is a front view of the locking piece;

FIG. 3 shows a strip of a plurality of the locking pieces of FIG. 2 connected to one another;

FIG. 4 is a side view of the tightening strap of the cable tie of this invention in longitudinal section taken along the line IV—IV of FIG. 5;

FIG. 5 is a plan view of the tightening strap of FIG. 4 showing its transverse ribs;

DETAILED DESCRIPTION

Figure 9:
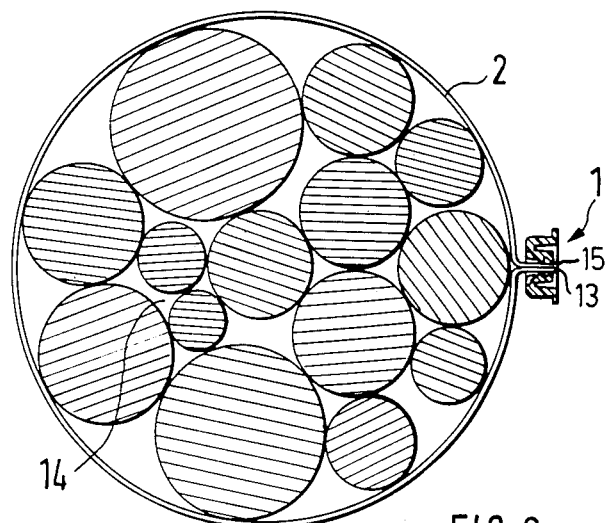
FIG. 9 shows a cable bundle wrapped round tightly by the cable tie of the invention.

The cable tie of this invention can be produced from hard-elastic plastic, for example, Hostaform or the like and serves, for example, to tie cable bundles or even individual cables to any elongated supports. The cable tie is composed of a locking piece or clip 1 (FIGS. 1 to 3) and a separate tightening strap 2 (FIGS. 4 and 5) which, after being wrapped round a cable bundle 14 as shown in FIG. 9, is clamped firmly in the locking piece 1 at its two ends 13 and 15 (FIG. 9).

The locking piece or clip 1 comprises a housing 3 having an orifice 7 through which the ends of tightening strap 2 pass, and a pair of locking means which project inwardly from opposite sides of side walls 5 of the housing 3 and on the side of the locking piece that faces the cable bundle for interacting with the transverse ribs of the strap. As embodied, this locking means comprises a pair of tongues 4 that are resiliently connected to side walls 5 by integral webs 8 providing the tongues with a hinged spring-like action. Each tongue 4 carries, on its inner side, at least one engaging tooth 6 at its outer end, the face 16 of the tooth that faces the cable bundle 14 being bevelled, while the opposite face 17 extends approximately perpendicular relative to the direction of passage of the tightening strap 2.

Locking pieces 1 are preferably produced in the form of a strip, the individual locking pieces 1 being joined to one another by means of attachment webs 9 (FIG. 3) so that they can be torn off as needed. In this form, the locking pieces 1 can easily be handled in a suitable assembly tool.

The tightening strap 2 illustrated in FIGS. 4 and 5 is smooth on one longitudinal side, while the opposite side has a plurality of transverse ribs 10 which extend between two longitudinal side walls 11 of approximately the same height as the ribs. This tightening strap 2 can be produced in long lengths, for example by extrusion with subsequent rolling of the transverse ribs, and can be supplied in the form of roll. Thus, if appropriate, it can also easily be used in the above-mentioned assembly tool.

So that tightening strap 2 can easily be guided through locking piece 1, the gap "s" (FIG. 1) between teeth 6 when they are in their initial or non-engaged state is set so that it is somewhat larger than the single thickness "e" of a single strap (FIG. 4).

To ensure that the teeth 6 engage securely with the transverse ribs 10 after the second end of tightening strap 2 has been guided back through the locking piece 1, the gap "s" must always be smaller than double the strap thickness "e" less the single depth "z" between the transverse ribs 10 (FIG. 4).

To achieve secure locking, it is even better if, when the tongues 4 are in their non-engaged state, that the gap "s" be equal to double the strap thickness "e" minus double the transverse rib depth "z". Then the teeth 4 can penetrate more fully into the gap between the transverse ribs 10 to as far as the inside bottom surface 12 of the gaps in the strap. Allowing for tolerance deviations of teeth 6, which are unavoidable in molded plastics, the gap "s" preferably should be even smaller, so that teeth 6 will necessarily spring back into the gaps between the ribs after the strap has been passed back through the clip for the second time.

Figure 6:
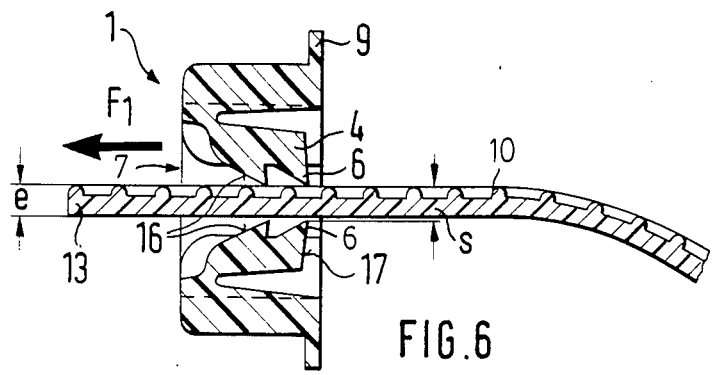
FIG. 6 shows the locking piece of FIG. 1 with one end of the tightening strap being introduced into the piece.

The assembly sequence of the tie is illustrated in FIGS. 6 to 9 and takes place as follows:

In a first step, a free end 13 of the tightening strap 2 is guided through orifice 7 of locking piece 1 between the engaging teeth 6 in the direction of arrow $F_1$. This direction $F_1$ is from the side of the locking piece remote from where the cable bundle 14 will be located and in a direction opposite to the sloping faces 16 of the teeth 6 or counter to the locking direction of the teeth (FIG. 6). Because the gap "s" is greater than the thickness of the strap, the strap can pass readily through the clip without ribs 10 getting hung-up on the teeth 6 of tongues 4.

Figure 7:
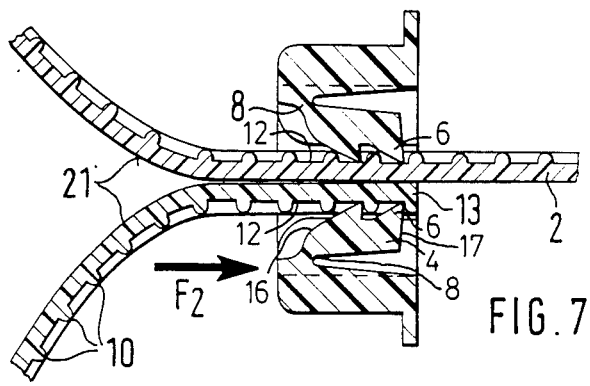
FIG. 7 is a view similar to FIG. 6, but showing the other end of the tightening strap being guided back through and engaged with the piece after being wrapped around a cable bundle (not shown)

Next, end 13 of tightening strap 2 is pulled further through locking piece 1 and guided around a cable bundle 14 (FIG. 9), and then reintroduced back into locking piece 1 from the opposite side in the direction of arrow $F_2$ (FIG. 7). At this point, the flat lower surface 21 of end 13 slides along the similar flat surface of the part of the strap already in the clip, while the ribs 10 engage the sloping faces 16 of the teeth 6 of lower tongue 4 forcing the tongue to open up until at least two ribs 10 of free end 13 have been caught behind the faces 17 of the engaging teeth 6. Both tongues 4 shift outwards towards walls 5 of housing 3 as end 13 is inserted back in the clip and then spring back again, until the teeth 6 rest against the bottom 12 of the gaps between ribs 10 as shown in FIG. 7, as a result of the elastic web 8 that connects the tongues to the side walls of the housing.

Figure 8:
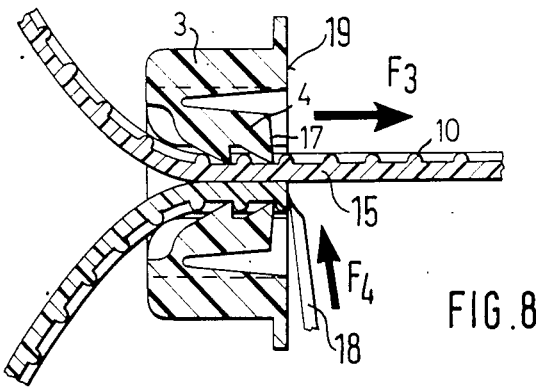
FIG. 8 is a view similar to FIG. 7 and shows the loose strap end first introduced into the locking piece being pulled back to wrap the strap tightly around the bundle.

In a third step, the rear end 15 of the tightening strap 2, which would be coming from a supply roll (not shown) is then pulled back in the direction of arrow $F_3$ (FIG. 8), to tighten the strap around the cable bundle 14 (FIG.9). In this case the sloping faces 16 of the teeth 6 of upper tongue 4 permit the tongue to flex outwardly as the strap is pulled in the direction $F_3$, but the relatively perpendicular faces 17 on the opposite side of the teeth engage the ribs 10 on the strap end 15 and prevent it sliding back in the opposite direction. The excess length of end 15 is then cut off along the rear wall 19 of housing 3 in the direction of arrow $F_4$ by means of a knife 18 or the like, to avoid any needless waste of the tightening strap (FIG. 8).

This simple structure therefore permits the tightening strap to easily be introduced into the orifice and its end, after being wrapped round the bundle of cables, can likewise easily be guided back through the orifice until the first few ribs engage with the engaging teeth, the engaging tongues springing open approximately the amount of a single rib depth and then springing back again elastically so that the teeth rest on the strap bottom between the ribs.

Figure 10:
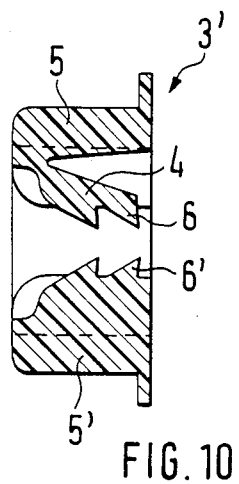
FIG. 10 shows, in section, a modified embodiment of the locking piece.

FIG. 10 illustrates another embodiment of the locking piece, in which the housing 3 is provided with only a single spring-open engaging tongue 4 which, in the embodiment shown, is equipped with two engaging teeth 6. In contrast, the opposite engaging teeth 6' are fixed to side wall 5' of housing 3'.

Figure 11:
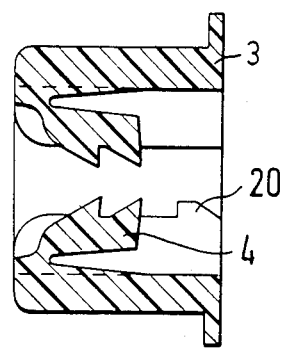
FIG. 11 shows, in section, yet a further embodiment of the locking piece.

Yet a further embodiment of the locking piece is illustrated in FIG. 11. This differs from the embodiment of FIGS. 1 and 2 only in that the housing 3, in the region behind the opening end of one of the engaging tongues 4, is provided with a stop nose 20, a distance behind it equal to the width of a transverse rib 10. This nose 20 limits the passage of the free end 13 of the strap in its return through the locking piece 1 to ensure that only as many transverse ribs 10 as are necessary to ensure adequate locking pass engaging tongue 4.

It will be apparent to those skilled in the art that various modifications and variations can be made to the device without departing from the scope or spirit of the invention.

What is claimed is:

1. A cable tie comprising a tightening strap of indeterminate length having a plurality of transverse ribs on at least one longitudinal surface thereof and a separate locking piece having a housing, an orifice in the housing through which two ends of the tightening strap can pass, and locking means projecting into the orifice from opposite sides of the housing for interacting with the transverse ribs, each of said locking means having at least one engaging tooth that operates in a first locking direction for engaging a rib of one end of the strap and preventing it, when engaged with a tooth, from passing through the orifice in the opposite direction, the gap between the teeth being larger than the thickness of the strap, but smaller than double the strap thickness less the height of a rib, with at least one of said locking means being resiliently connected to the housing so that it can flex open to permit one end of the strap to pass through the orifice in said first direction but will spring back to engage its tooth with a rib of the strap to prevent it from passing back in said opposite direction.

2. The tie of claim 1, wherein the gap between the engaging teeth is approximately equal to double the strap thickness less double the height of a rib.

3. The tie of claim 1, wherein the locking means comprises a pair of tongues each of which is resiliently connected at one end to the housing and having at least one engaging tooth at its other end which teeth extend into the orifice opposite each other.

4. The tie of claim 1, wherein one of the locking means comprises a tongue resiliently connected at one end to the housing and having an engaging tooth at its opposite end that extends into the orifice, while the other locking means comprises a tooth rigidly connected to the housing opposite the tooth on the tongue.

5. The tie of claim 1, including a stop nose in the region behind one of said locking means to limit the passage of one end of the tightening strap through the orifice after engagement of its tooth with ribs on the strap.

* * * * *